United States Patent [19]

Krühn

[11] 3,836,095

[45] Sept. 17, 1974

[54] ARRANGEMENT FOR AUTOMATICALLY GRIPPING AND WINDING UP A RECORDING TAPE

[75] Inventor: Jürgen Krühn, Konstanz, Germany

[73] Assignee: Licentia Patent-Verwaltungs-G.m.b.H., Frankfurt am Main, Germany

[22] Filed: Nov. 27, 1972

[21] Appl. No.: 309,664

[30] Foreign Application Priority Data

Nov. 30, 1971 Germany .......................... 2159212

[52] U.S. Cl. ...................... 242/195, 226/91, 242/76, 352/157

[51] Int. Cl. ........................ G03b 1/04, G11b 15/32

[58] Field of Search .................... 242/195, 197–200, 242/76; 352/157, 158; 226/91, 92

[56] References Cited

UNITED STATES PATENTS

| | | | |
|---|---|---|---|
| 3,297,267 | 1/1967 | Wiggs | 242/195 |
| 3,643,893 | 2/1972 | Neff | 242/195 |
| 3,744,736 | 7/1973 | Kruhn | 242/195 |

*Primary Examiner*—Leonard D. Christian
*Attorney, Agent, or Firm*—Spencer & Kaye

[57] ABSTRACT

An arrangement for winding a recording tape onto a take-up core in a tape recording playback system, the tape being attached to a stiff leader of greater width than the tape. Two fixed guide-members surround the core in order to guide the edges of the leader. An intake channel is formed by extensions of the guide members which open in a line substantially tangential to the periphery of the take-up core. The inner perimeters of these guide members are spaced from the peripheral surface of the take-up core in order that the leader of the recording tape can be led through the intake channel into operative engagement with the take-up core.

7 Claims, 5 Drawing Figures

ARRANGEMENT FOR AUTOMATICALLY GRIPPING AND WINDING UP A RECORDING TAPE

BACKGROUND OF THE INVENTION

The present invention relates to an arrangement for automatically gripping and winding up a recording tape on the take-up core of a recording and/or playback instrument, and in particular to an arrangement in which the recording tape is provided with a stiff leader which is wider than the tape and which is pushed along a set guide path in the direction of the driven take-up core and in which at least one guide surface is provided along which the front portion of the leader tape slides as it approaches the take-up core so that it can come into operative engagement with the core and be gripped thereby. Such recording tapes can be tape recording carriers of any type.

An example of an arrangement of this kind for magnetic tape systems is disclosed in U.S. application Ser. No. 137,264 to Krühn et al., filed Apr. 26, 1971, and corresponding to German Offenlegungsschrift (Laid Open Application) No. 2,020,418. In the windup device which is disclosed in the Krühn et al. application, two or more pivotal guide brackets are provided. These guide brackets are adapted to conform to the periphery of the take-up core and are pivoted to be operatively positioned against the driven take-up core, during the starting phase of the recording system, and lightly contacting the surface of the core. The front portion of the advancing leader slides along the first guide bracket which forms the above-mentioned guide surface in a tangential line with respect to the take-up core. The leader is then gripped by friction between the surface of the take-up core and the guide bracket and is then wound up in cooperation with a further guide bracket or brackets. Thereafter, the guide brackets are outwardly pivoted in order to permit the recording tape to be wound around the core.

SUMMARY OF THE INVENTION

An object of the invention is to provide an arrangement for automatically winding up a recording tape onto a take-up core in a dependable and efficient manner.

Another object of the invention is to provide an arrangement for winding a recording tape onto a take-up core in which there are fixed guide members that need not be pivoted into and out of engagement with the take-up core.

These and other objects are achieved by a novel arrangement for winding up a recording tape which has a leader of greater width than the tape. The arrangement includes two guide members which fixedly surround the periphery of the take-up core. The guide members have extensions at one point along their perimeter so as to form an intake channel which opens in a path approximately tangential to the peripheral surface of the take-up core. The spacing between the guide members is greater than the width of the recording tape and smaller than the width of the leader. The guide members are spaced from the peripheral surface of the take-up core by a distance greater than the thickness of the wound-up leader. The leader is fed through the intake channel into operative engagement with the take-up core.

DESCRIPTION OF THE PREFERRED EMBODIMENTS

Figure 1:
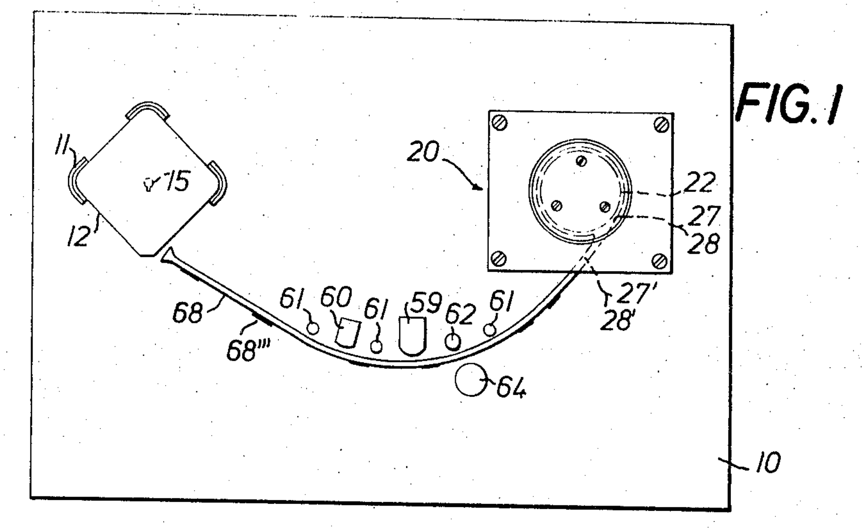
FIG. 1 is a plan view of a magnetic tape recorder having a take-up device according to the present invention.
Figure 2:
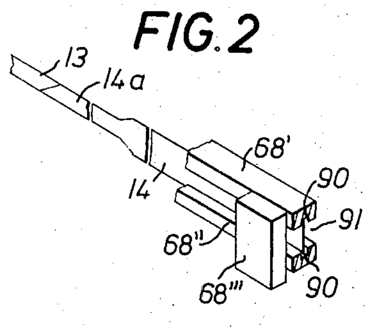
FIG. 2 is a perspective sectional view of the guide path of the system of FIG. 1 with the recording tape, having an attached leader, inserted in the guide path.

In the magnetic tape recorder shown in FIG. 1, angular pieces 11 are disposed on a base plate 10 for mounting a cassette 12. The cassette is of the so-called single-reel type which contains a reel bearing a coil of recording tape which can be a magnetic tape. As described in detail, for example, in the above-mentioned Krühn et al. application, the front portion of the magnetic tape 13 is provided with a stiff leader 14 (as shown in FIG. 2) which is wider than the recording tape. The leader is preferably tapered to include a section 14*a* at the point of connection to the recording tape, which section has the same width as the recording tape. A take-up pin 15 engaging in a bore in the reel is attached to the shaft of a left-hand side windup motor (not shown). When the tape recorder is started, the reel is driven in a counterclockwise direction by the take-up pin 15 so that the leader 14 is pushed out of a slit in the side wall of the cassette 12 (which slit has not been shown).

The tape recorder, as in the above-mentioned Krühn et al. application, has a combined recording and playback head 59, an erase head 60 and guide pins 61. A drive capstan 62 is connected to the shaft of a motor (which has not been shown). A pivotally mounted pressure roller 64 is also provided which can be brought into and out of engagement with the capstan in a known manner in order to engage the tape for the purpose of advancing it.

A take-up device 20 is located on the right-hand side of the tape recorder, which device serves to grip and wind up the recording tape, as will be explained in detail below.

A guide path 68 extends from the slit in the cassette 12 to the take-up device 20. The path 68 has been shown schematically in FIG. 1. The path is fastened to the base plate 10 on supports 68'''. The path guides the leader 14, which is pushed out of the reel of the cassette when the instrument is started, past the heads 59, 60 and guide pins 61 to within the gripping range of the take-up core of the take-up device.

The guide path 68 can be formed by two superimposed guide rails 68' and 68'' as can be seen in FIG. 2. These rails are each provided with a groove 90 along which the upper or lower edge, respectively, of the leader 14 is guided. The opening 91, which is formed by the spacing between the two guide rails, is large enough on the side facing the recording heads that the recording tape 13 following the leader can pass out of this opening and come into engagement with the above-described elements 59 to 62.

Figure 4:
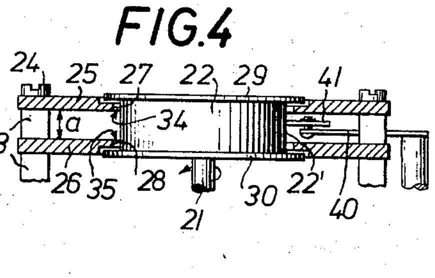
FIG. 4 is a cross-sectional view taken along line IV—IV of FIG. 3 with the empty take-up core being shown in elevation.
Figure 3:
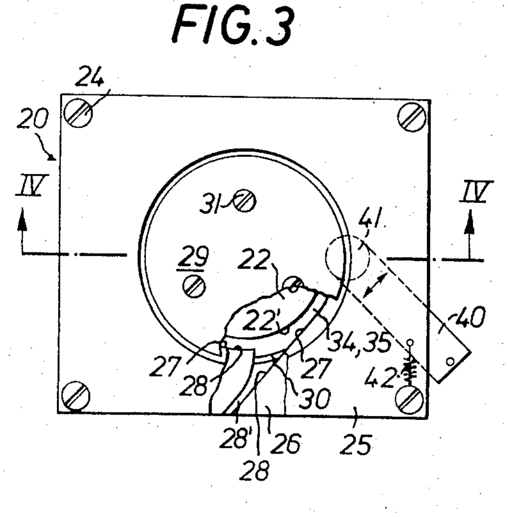
FIG. 3 is a plan view of the take-up device of FIG. 1 drawn on a larger scale with a portion being partially cut away in order to expose the lower portions.
Figure 5:
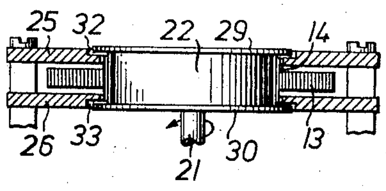
FIG. 5 is a view similar to that of FIG. 4 with the take-up core being shown in elevation and a coil of recording tape formed thereon being shown in sectional view.

As shown in FIGS. 3, 4, and 5, a take-up core 22 is fastened on the shaft 21 of a right-hand side winding motor (not shown) of the tape recorder. The peripheral surface 22' of the take-up core 22 is provided in a known manner with a coating having a high coefficient of friction. Two parallel guide plate members 25 and 26 are fastened to the base plate 10 by means of spacers 23 and screws 24, the distance between the plates being greater than the width of the magnetic tape 13.

Two guide surfaces 27 and 28 are formed by the inner edges of guide plate members 25 and 26 which surfaces surround the take-up core 22 over a substantial portion of its periphery. However, at one point of their periphery they form intake channels 27' and 28' (FIGS. 1 and 3) which open approximately tangentially to the peripheral surface of the take-up core. The lower intake channel 28' can be seen in FIG. 3 wherein the plate 25 with the intake channel 27' is cut away. The guide surfaces 27 and 28 serve to guide the edges of the leader 14. The radial distance between guide surfaces 27 and 28 and the surface 22' of the take-up core 22 is adapted to the thickness of the wound leader 14 so that it will not brush against the guide surfaces.

According to a further advantageous feature, the take-up core 22 is provided with two flanges 29 and 30 whose mutual spacing is adapted to the width of the leader 14. The upper flange 29 is releasably fastened to the take-up core by means of screws 31. The radius of these flanges is preferably greater than the radius of the annular portion of the guide surfaces 27 and 28 which are disposed therebetween. Each of the plates 25 and 26 is also provided with an annular recess 32 or 33, respectively, as shown in FIG. 5, on their exterior surface into which the corresponding flange 29 or 30, respectively, of the take-up core 22 engages.

After the start of the tape recorder, the wide leader 14 is advanced in a known manner along the guide path 68 into the take-up device 20 as shown in FIG. 1 whose take-up core 22 is driven in counterclockwise direction. As soon as the leader has entered the annular regions 34 and 35 between the take-up core 22 and the guide surfaces 27 and 28, it is gripped through friction by the surface 22' of the take-up core, and carried along therewith. Upon passing once around the take-up core it automatically tightens so that the further turns of the leader and, if desired, a few turns of the magnetic tape 13 are wound up under tension upon the core.

With a suitable control, which need not be discussed in detail in connection with the present invention, the take-up pin 15 and the shaft 21 are then stopped. This terminates the starting process and the tape recorder is ready to play. During the subsequent recording or playback process a coil of the recording tape 13 is produced between plates 25 and 26, as shown in FIG. 5.

The above described take-up device 20 operates with complete dependability under the condition that the leader 14 is advanced until the first turn is completed on the take-up core 22 and that the natural radius of curvature of the leader in the longitudinal direction is less than the radius of curvature of the guide surfaces 27 and 28. These conditions can generally be fulfilled quite readily.

The arrangement according to the present invention can be made independent of the above-mentioned conditions if, in a known manner, mechanical or pneumatic means are additionally provided to press the leader 14 against the take-up core 22 during its first circuit therearound. Such mechanical and pneumatic means are well known. For example, as shown schematically in FIGS. 3 and 4, a pressure roller 41 may be provided which is pivotally mounted on an arm 40 and which, at least during the winding of the first turn of the leader around core 22, is pressed against the take-up core 22 by a spring 42 and is then removed in a known manner from the area where the coil is to be formed.

It will be understood that the above description of the present invention is susceptible to various modifications, changes and adaptations, and the same are intended to be comprehended within the meaning and range of equivalents of the appended claims.

I claim:

1. In an apparatus for winding onto a peripheral surface of a take-up core a recording tape having attached thereto a stiff leader of greater width than the tape for use in a tape recording system, the apparatus including means for advancing the recording tape along a guide path towards the take-up core and means for driving the take-up core, the improvement comprising: two spaced parallel plates having inner annular edges constituting first and second guide members, said first and second guide members fixedly surrounding a substantial portion of the periphery of said core, said guide members being spaced from each other by a distance greater than the width of the recording tape and smaller than the width of the leader and being spaced from the peripheral surface of said take-up core by a distance greater than the thickness of the wound-up leader, said guide members being provided at one point along their periphery with extensions defining, in continuation of said guide path, an intake channel opening substantially tangentially to said take-up core, whereby the leader is guided through said intake channel to the space between said guide members and the peripheral surface of said take-up core so that the leader becomes operatively engaged with the peripheral surface of said take-up core.

2. An arrangement as defined in claim 1 wherein said take-up core comprises two radial flanges spaced from each other by a distance slightly larger than the width of the leader.

3. An arrangement as defined in claim 2 wherein the radius of said flanges is greater than the radius of said annular edges and said guide members are located between said flanges.

4. An arrangement as defined in claim 3 wherein an annular recess is provided in each of said plates on its exterior surface and each of said flanges of the take-up core is seated within a respective one of said annular recesses.

5. An arrangement as defined in claim 1 wherein said take-up core has a peripheral surface having a high coefficient of friction.

6. An arrangement as defined in claim 1 further comprising means for pressing the leader against said take-up core until the leader has been wound around the core for at least one turn.

7. An arrangement as defined in claim 6 wherein said means includes a pressure roller and mounting means for said pressure roller for pressing same against said take-up core at least during the first turn of the leader around said take-up core and for thereafter removing said pressure roller from that area between said guide members in which a coil of the recording tape is to be formed.

* * * * *